(No Model.)

A. G. CUMMINGS.
SEMAPHORE SIGNAL.

No. 340,489. Patented Apr. 20, 1886.

Witnesses:
Geo. W. Parsons
Ed. M. Killough

Inventor:
Albert G. Cummings

UNITED STATES PATENT OFFICE.

ALBERT G. CUMMINGS, OF HARRISBURG, PENNSYLVANIA.

SEMAPHORE-SIGNAL.

SPECIFICATION forming part of Letters Patent No. 340,489, dated April 20, 1886.

Application filed May 2, 1883. Serial No. 93,647. (No model.)

*To all whom it may concern:*

Be it known that I, ALBERT G. CUMMINGS, a citizen of the United States, residing at Harrisburg, in the county of Dauphin and State of Pennsylvania, have invented a new and useful Improvement in Semaphore-Signals, of which the following is a specification.

My invention relates to a form of signal commonly known as a "semaphore-signal," as used on railways, from which the information is determined by the position of an arm pivoted on a post or other means of support, and capable of being revolved in a vertical plane.

Heretofore the semaphore-signals used for railway-signaling have been made in various forms, and have been used in various positions as daylight-signals, and whenever it has been required to use a signal at night or in darkness it has been necessary to depend on arrangements of colored glasses moved in front of lamps, by which certain colors will be shown when "danger" is to be signaled, and other colors shown when "safety" is to be signaled.

The employment of lights of various colors has always been attended with difficulties and dangers not necessary to be enumerated; and it is the object of my invention to supply a semaphore-arm signal that will be visible in the absence of daylight in whatever position it may be placed, and that will, by the position in which it is seen, convey the desired information to the beholder essentially the same as the semaphore-signals heretofore used by daylight convey information to the beholder by the position in which the semaphore is seen. I attain this object by apparatus illustrated in the accompanying drawings, in which—

Figure 1:
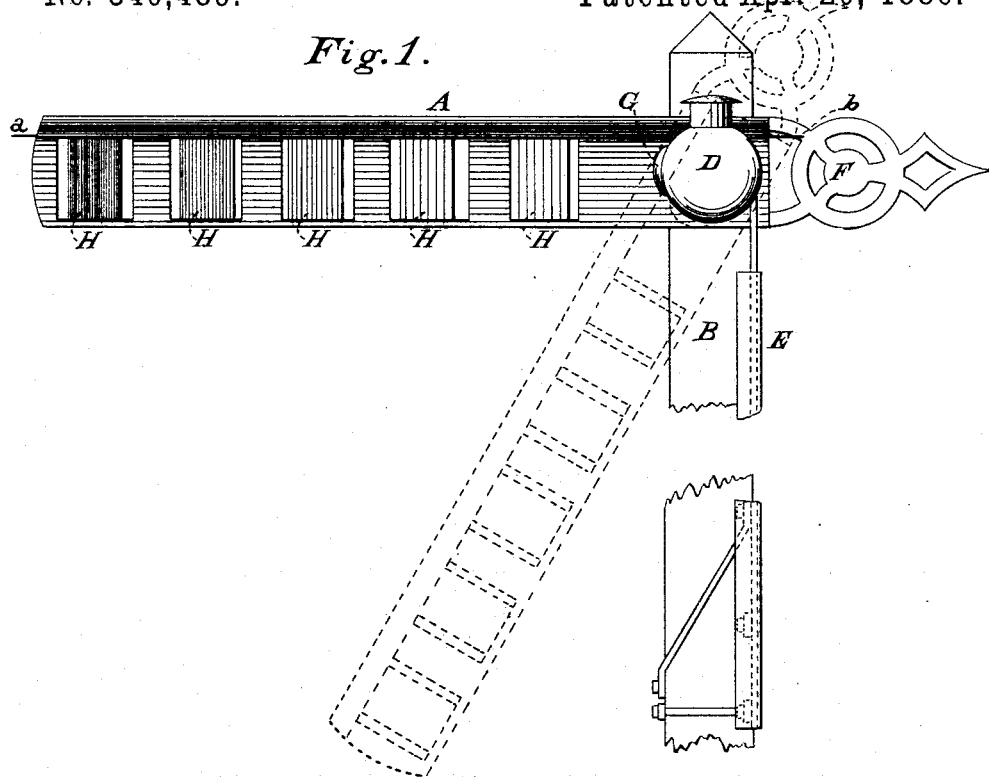
Figure 2:
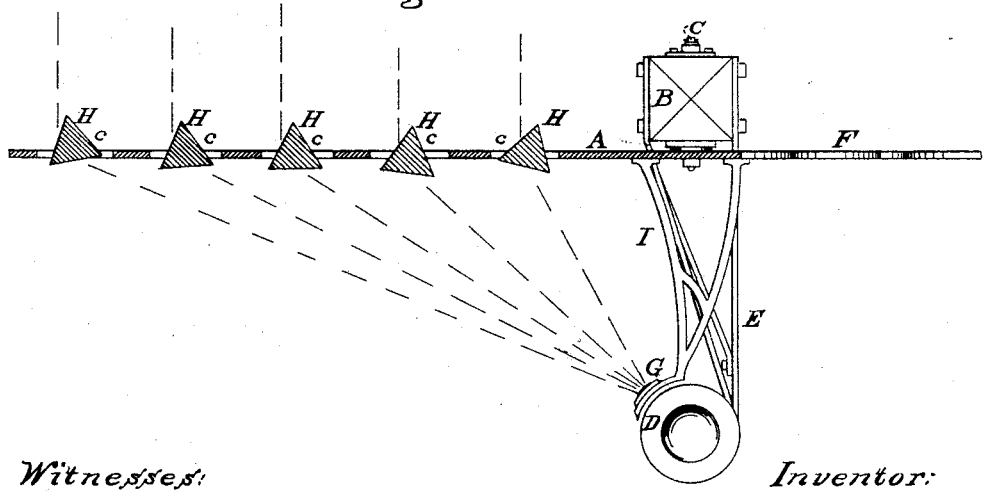

Figure 1 is a side elevation of the semaphore-arm. Fig. 2 is a plan view with the semaphore A in section on line *a b* of Fig. 1.

In Figs. 1 and 2 I show a semaphore-arm, A, pivoted to the post B by means of an axis, C. This semaphore is illuminated by a lamp, D, which is supported in the rear of semaphore A by bracket E, attached to the post B. On a bracket, I, attached to and in the rear of the semaphore A, I fix a lens, G, in such a manner that the light of the lamp D will be projected toward the semaphore at a suitable angle.

The semaphore-arm A is made with one or more openings, *c c*, &c., within which I fix glass of a suitable form to receive rays of light from the lamp D and refract the light toward the point whence the semaphore should be observed, to which end I prefer to employ prisms, as shown.

The center of the lamp D will be placed on a line with the center of the axis C, and will be made of a globular or semi-globular form, for the purpose of allowing the lens G to move concentrically about the lamp. Within the lamp D a reflector may be employed to reflect the rays of light toward the lens G. The lens G, being attached to the semaphore-arm A, will move with it, and in all the positions of the semaphore will concentrate rays of light proceeding from the lamp D and transmit said rays of light onto that portion of the semaphore within which the prisms H H, &c., are arranged. The prisms H H, &c., are so arranged and fixed that the rays of light entering them from the lens G will be refracted and projected forward in lines essentially parallel to the axis C, toward the point from whence the semaphore should be visible.

By means of the prisms, arranged as described, the rays of light which pass through the openings in the semaphore will be projected directly forward with but little loss by divergent radiation, and will render the semaphore visible at a considerable distance, and I therefore consider this arrangement preferable; but in case a less brilliant signal will answer the purpose I may use in the openings in the semaphore various other forms of glass to refract the rays of light, such as roughened glass, checkered glass, glass rods set side by side, or other forms which will refract sufficient light to render the signal luminous and visible in darkness.

As shown, the semaphore-arm is arranged at a right angle to the axis C; but it may also be arranged at any other angle, if desirable. I extend a portion, F, of the arm A beyond the axis C, and make it of sufficient weight to counterbalance the weight of the larger portion of the arm A, so that it may be freely revolved to any desired position.

I have not shown any device for operating the signal or placing the arm in the position desired, as such devices are well known, and the constructer can readily apply to suit the circumstances of the case.

What I claim, and desire to secure by Letters Patent, is—

1. A semaphore-signal provided with a series of glass surfaces of forms adapted to refract rays of light from one common source, substantially as and for the purpose specified.

2. The combination of semaphore-signal A and lamp D, with lens G attached to semaphore A and arranged to project light thereon, substantially as and for the purpose set forth.

ALBERT G. CUMMINGS.

Witnesses:
  FRANK E. MARSHALL,
  CHAS. A. PARSONS.